(12) United States Patent
Carr et al.

(10) Patent No.: US 10,412,894 B2
(45) Date of Patent: Sep. 17, 2019

(54) GRAIN PROCESSING ASSEMBLY FOR A COMBINE

(71) Applicant: Gary W. Clem, Inc., Nevada, IA (US)

(72) Inventors: Brian W. Carr, Ames, IA (US); Scott A. Sporrer, Nevada, IA (US); Adam R. Koesters, Earling, IA (US); Ryan A. Carstensen, Bondurant, IA (US); Cody J. Sobotka, Ankeny, IA (US)

(73) Assignee: Gary W. Clem, Inc., Nevada, IA (US)

( * ) Notice: Subject to any disclaimer, the term of this patent is extended or adjusted under 35 U.S.C. 154(b) by 13 days.

(21) Appl. No.: 14/745,821

(22) Filed: Jun. 22, 2015

(65) Prior Publication Data

US 2016/0366828 A1   Dec. 22, 2016

(51) Int. Cl.
| | | |
|---|---|---|
| *A01F 12/10* | (2006.01) | |
| *A01F 7/06* | (2006.01) | |
| *A01F 12/18* | (2006.01) | |

(52) U.S. Cl.
CPC .............. *A01F 12/10* (2013.01); *A01F 7/06* (2013.01); *A01F 12/18* (2013.01)

(58) Field of Classification Search
CPC . A01F 12/10; A01F 12/18; A01F 7/06; A01D 41/06; A01D 57/06; A01D 57/20; A01D 61/008; A01D 61/02; A01D 65/00
See application file for complete search history.

(56) References Cited

U.S. PATENT DOCUMENTS

| | | | | |
|---|---|---|---|---|
| 858,696 A | * | 7/1907 | Anderson ............ | A01D 61/008 460/59 |
| 1,814,305 A | * | 7/1931 | Fleming .................. | A01F 12/18 460/59 |
| 2,133,396 A | * | 10/1938 | Neal ..................... | A01D 61/008 198/599 |
| 2,400,667 A | * | 5/1946 | Toews .................... | A01D 61/02 144/245.2 |
| 2,458,345 A | * | 1/1949 | Cass ...................... | A23N 15/10 100/152 |
| 2,518,521 A | * | 8/1950 | Carroll ................. | A01D 61/008 56/158 |
| 2,745,409 A | * | 5/1956 | Tillotson ................... | A01F 7/00 460/59 |
| 3,209,759 A | * | 10/1965 | Collins .................... | A01F 12/18 460/103 |
| 3,464,419 A | * | 9/1969 | De Pauw .................. | A01F 7/06 36/21 |
| 3,630,209 A | * | 12/1971 | Metzger .................. | A01F 12/10 460/13 |
| 3,967,719 A | | 7/1976 | Kloefkorn et al. | |
| 4,209,024 A | * | 6/1980 | Powell .................... | A01F 12/10 460/70 |
| 4,271,877 A | | 6/1981 | Whitaker et al. | |
| 4,574,815 A | * | 3/1986 | West .................... | A01F 12/442 460/80 |
| 4,611,606 A | * | 9/1986 | Hall ...................... | A01F 12/442 460/80 |
| 5,413,531 A | | 5/1995 | Tanis | |
| 5,497,605 A | * | 3/1996 | Underwood ........... | A01D 34/30 460/101 |

(Continued)

*Primary Examiner* — Robert E Pezzuto
*Assistant Examiner* — Adam J Behrens
(74) *Attorney, Agent, or Firm* — Zarley Law Firm, PLC

(57) ABSTRACT

A grain processing assembly having a feeder assembly with a discharge end that is adjacent and above an opening in a thresher assembly.

3 Claims, 2 Drawing Sheets

(56) References Cited

U.S. PATENT DOCUMENTS

| | | | |
|---|---|---|---|
| 5,551,215 A | 9/1996 | McDonald et al. | |
| 5,557,912 A * | 9/1996 | Voss | A01D 41/06 |
| | | | 56/130 |
| 5,664,402 A | 9/1997 | Sandvik et al. | |
| 6,325,714 B1 | 12/2001 | Tanis et al. | |
| 6,979,261 B1 | 12/2005 | Day et al. | |
| 7,811,162 B2 | 10/2010 | Flickinger | |
| 8,157,629 B2 | 4/2012 | Yanke et al. | |
| 8,821,229 B2 | 9/2014 | Stan et al. | |
| 9,301,450 B2 * | 4/2016 | Boyd | A01D 61/008 |
| 2002/0155867 A1 * | 10/2002 | Visagie | A01F 12/442 |
| | | | 460/70 |
| 2004/0112025 A1 * | 6/2004 | Claeys | A01D 61/008 |
| | | | 56/16.4 R |
| 2007/0197272 A1 * | 8/2007 | Ramp | A01F 12/10 |
| | | | 460/16 |
| 2007/0251203 A1 * | 11/2007 | Coers | A01D 61/02 |
| | | | 56/181 |
| 2009/0113867 A1 | 5/2009 | Birrell et al. | |
| 2012/0184339 A1 | 7/2012 | Schulz | |
| 2013/0313077 A1 * | 11/2013 | Boyd | A01D 61/008 |
| | | | 198/617 |
| 2013/0337876 A1 * | 12/2013 | Johnson | A01F 12/18 |
| | | | 460/66 |

* cited by examiner

GRAIN PROCESSING ASSEMBLY FOR A COMBINE

BACKGROUND OF THE INVENTION

This invention is directed to a grain processing assembly for a combine and more particularly to a top feed grain processing assembly.

Grain processing assemblies for combines are well known in the art. Present assemblies include, in part, a feeder assembly that delivers crop material to the bottom of a threshing assembly. In this arrangement, crop material can become plugged, clogged, or stuck on the feeder assembly. In addition, residual grain can become trapped in the threshing assembly and feeder assembly. This is particularly a problem with seed research plot combines where contamination between different seeds must be avoided. As such, a need exists in the art for an assembly that addresses these needs.

Therefore, an objective of the present invention is to provide a grain processing assembly where crop material is fed to the top of a threshing assembly.

A further objective of the present invention is to provide a grain processing assembly that reduces or eliminates cross contamination.

These and other objectives will be apparent to one of ordinary skill in the art based upon the following written description, drawings and claims.

SUMMARY OF THE INVENTION

A grain processing assembly for a combine having a feeder assembly and a thresher assembly. The feeder assembly has a first conveyor having an input end and a discharge end and a second conveyor positioned above the first conveyor.

The thresher assembly has a rotatable rotor disposed within a housing. The housing has an opening that is positioned adjacent to and below the discharge end of the feeder assembly, so that crop material falls from the discharge end into the threshing assembly.

DETAILED DESCRIPTION OF THE PREFERRED EMBODIMENTS

Figure 1:
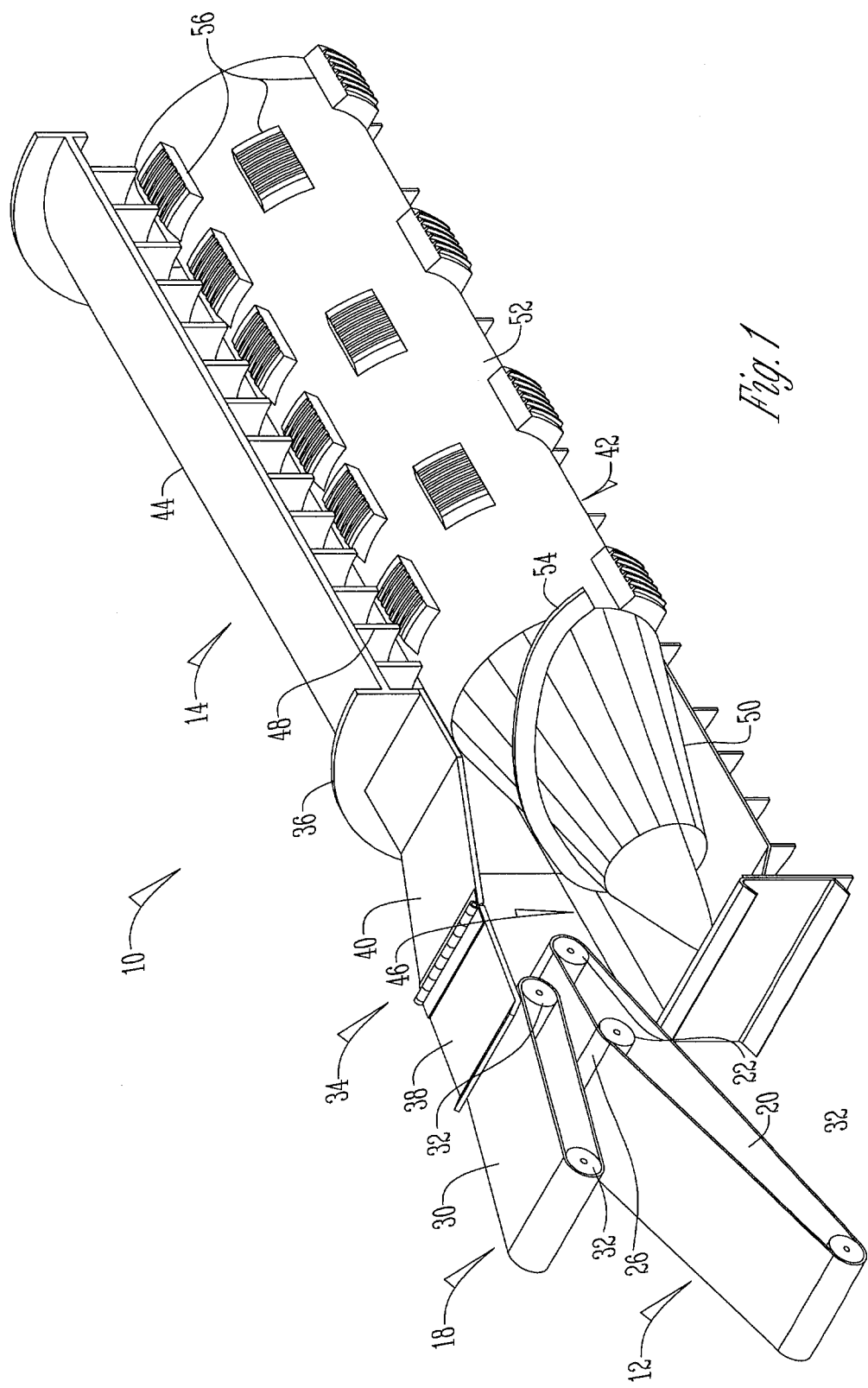
FIG. 1 is a perspective sectional view of a grain processing assembly.
Figure 2:
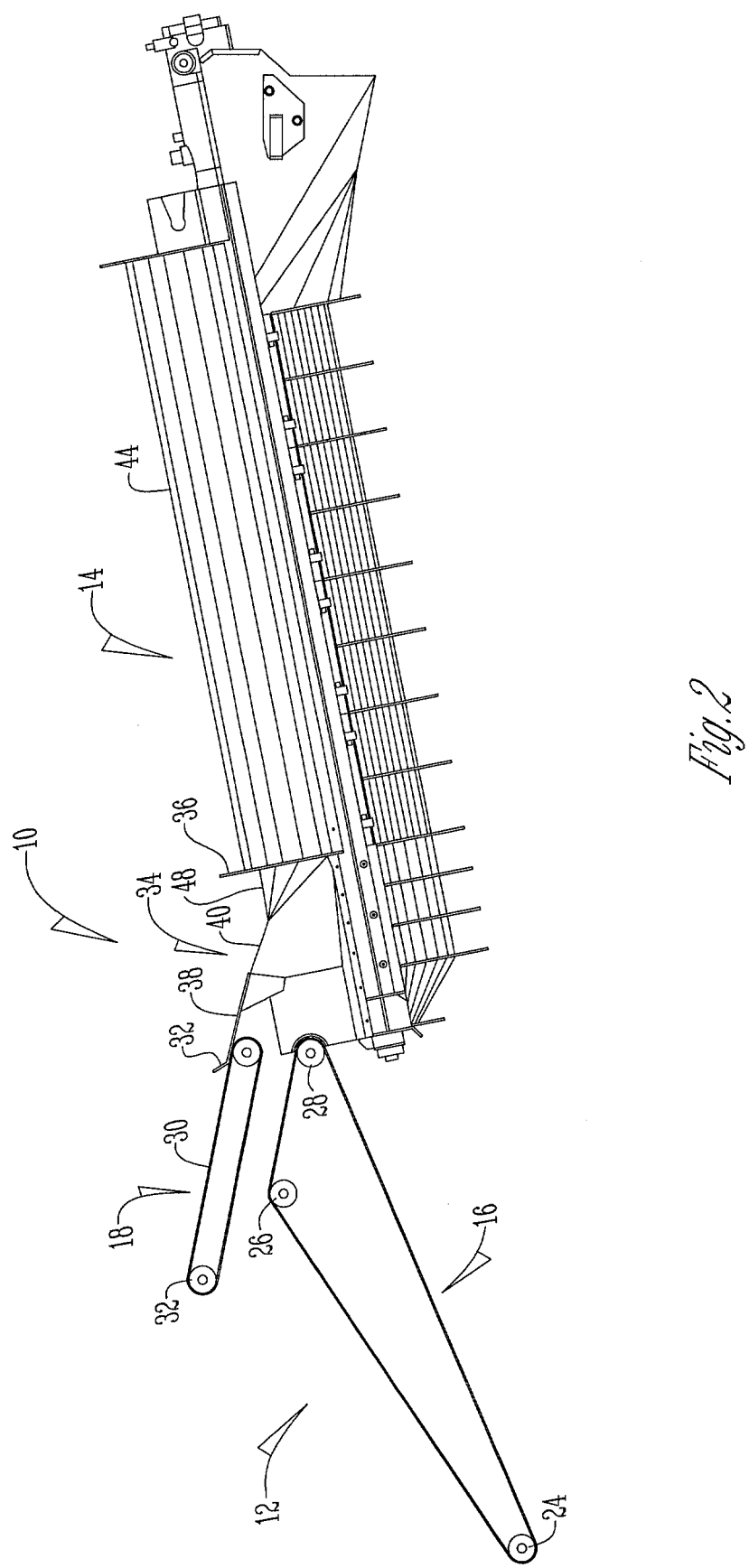
FIG. 2 is a side view of a grain processing assembly.

Referring to the Figures, a grain processing assembly 10 for use with a combine include a feeder assembly 12 and a threshing assembly 14. The feeder assembly 12 includes a lower first conveyor 16 and an upper second conveyor 18. The first conveyor 16 has a continuous belt 20 mounted about a plurality of pulleys 22. Preferably, the position of one or more pulleys 22 are adjustable to change the angles of the conveyor 16.

Generally, the first conveyor 16 angles upwardly form an input end 24 to a transition point 26. From the transition point 26 to the discharge end 28 the first conveyor 16 changes angle. The discharge end 28 of the first conveyor is positioned above or on top of the thresher assembly 14 so that grain falls into the thresher assembly 14. The second conveyor 18 is positioned above a portion of the first conveyor 16 and includes a continuous belt 30 mounted about a plurality of pulleys 32. Pulleys 32 are also adjustable to change position in order to change the angle of the second conveyor 18.

Engaging the second conveyor 18 is an adjustable hood 34. The hood 34 extends to and is connected to a first end 36 of the thresher assembly 14. The hood 34 has a first plate 38 that is hingedly connected to a second plate 40.

The thresher assembly 14 includes a rotor 42 that rotates about a longitudinal axis. The rotor 42 is disposed within a housing 44 that has an opening 46 on a top portion 48 at the first end 36 of the thresher assembly 14 adjacent the discharge end 28 of the feeder assembly 12. The housing 44 has a conventional concave and grate configuration. The rotor 42 has a front portion 50 and a rear portion 52. The front portion 50 tapers outwardly from an end toward the rear portion 52. The front portion 50 has an impeller blade 54 that spirally wraps around the front tapered portion 50. The rear portion 52, which is generally uniform in diameter, has a plurality of thresher members 56.

In operation, crop material is transported on the first conveyor 16 from the input end 24 to the discharge end 28. The second conveyor 18 assists in directing the crop material to the discharge end. At the discharge end 28 the crop material falls through the opening 46 in the housing 44 to the front portion 50 of the rotor 42. The hood 34 assists in directing crop material through the opening 46 and is adjustable to change the angle of deflection.

The impeller blade 54 sweeps the lower portion of the adjacent feed assembly moving crop material & residual grain toward the rear portion 52. The thresher members 56 then engage the crop material to separate the grain which falls through the housing.

Accordingly, a grain processing assembly for a combine has been disclosed that at the very least meets all the stated objectives. In particular, by feeding crop material to the top of the threshing assembly the likelihood of residual crop material left in the feeder assembly is reduced or eliminated. Also, the possibility of cross contamination of seed is eliminated.

What is claimed is:

1. A grain processing assembly for a combine, comprising:
   a feeder assembly having a first lower conveyor that includes a continuous belt mounted about a plurality of pulleys with an input end, a transition point, and a discharge end; wherein the transition point is positioned between and above the input end and the discharge end wherein a position of one or more of the plurality of pulleys is adjustable to change angles of the conveyor as the conveyor extends between the input end and the transition point and extends between the transition point and the discharge end;
   a second upper conveyor having a continuous belt mounted about a plurality of pulleys and positioned above the first lower conveyor, wherein the second upper conveyor is positioned to assist the lower first conveyor in directing crop material being transported on the lower first conveyor to the discharge end of the first lower conveyor; and
   a threshing assembly having a rotor disposed within a housing wherein the housing has an opening positioned adjacent to and below the discharge end of the first lower conveyor; wherein the first lower conveyor is configured to change angle from the transition point to the discharge end in relation to the angle of the first lower conveyor between the input end to the transition point.

2. The grain processing assembly of claim 1 wherein the first lower conveyor angles upwardly from the input end to the transition point.

3. The grain processing assembly of claim 1 further comprising the second upper conveyor wherein the plurality of pulleys for the second upper conveyor are adjustable to change a position of the plurality of pulleys in order to change an angle of the second upper conveyor.

\* \* \* \* \*